UNITED STATES PATENT OFFICE.

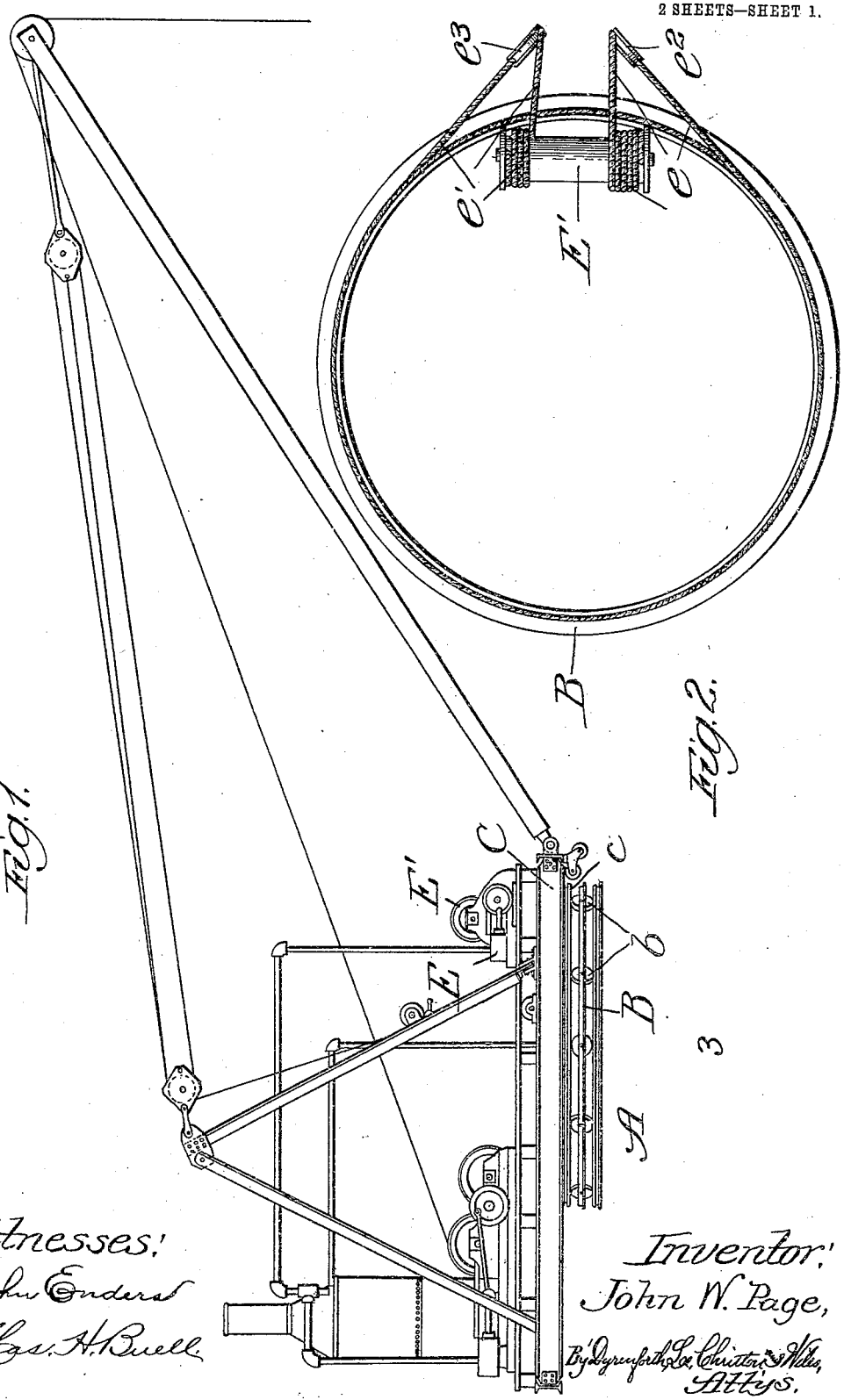

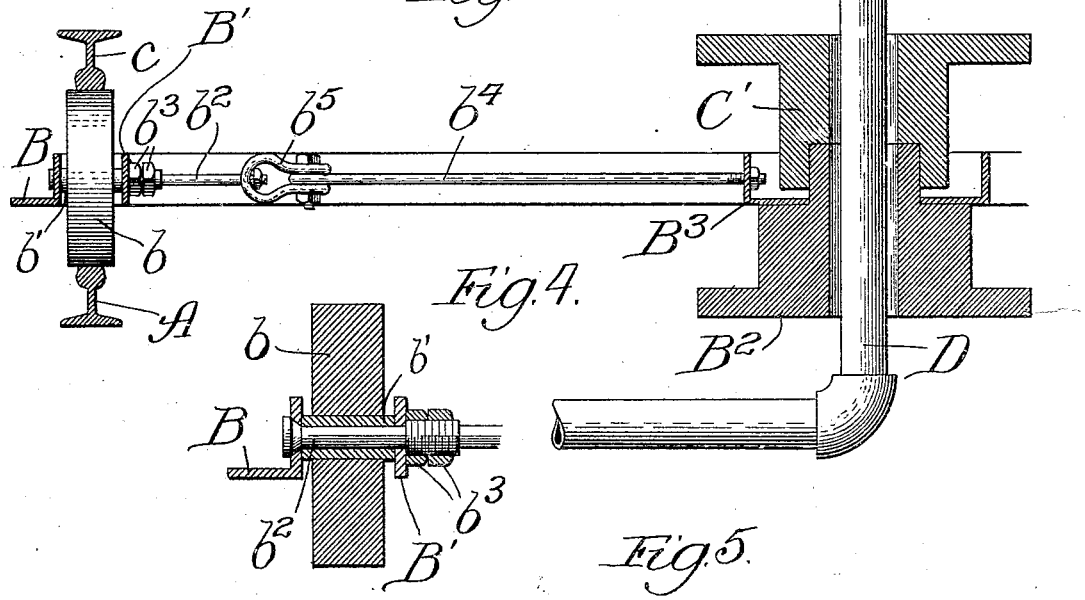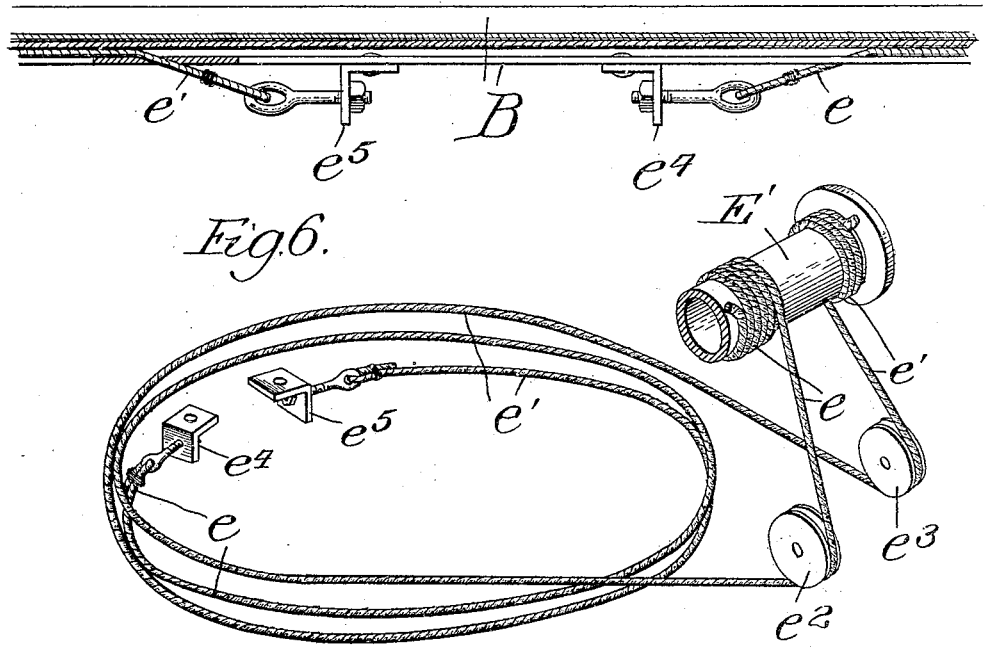

JOHN W. PAGE, OF CHICAGO, ILLINOIS.

DERRICK-PLATFORM AND TURN-TABLE.

No. 931,703.  Specification of Letters Patent.  Patented Aug. 17, 1909.

Original application filed January 24, 1908, Serial No. 412,401. Divided and this application filed June 1, 1908. Serial No. 436,027.

*To all whom it may concern:*

Be it known that I, JOHN W. PAGE, a citizen of the United States, residing at Chicago, in the county of Cook and State of Illinois, have invented a new and useful Improvement in Derrick-Platforms and Turn-Tables, of which the following is a specification.

My invention relates to certain new and useful improvements in derrick-platforms and turn-tables, and is fully described and explained in the specification and shown in the accompanying drawings, in which:

Figure 1 is a side elevation of my improved construction; Fig. 2 is a top plan, diagrammatically illustrating the arrangement of the turning-cables; Fig. 3 is an enlarged radial section through the spider and adjacent parts, taken at the line 3 on Fig. 1; Fig. 4 is an enlarged section through one of the wheels of the spider; Fig. 5 is an elevation showing the means of attachment of the turning-cables to the spider; and Fig. 6 is a perspective view showing the arrangement of the turning-cables.

Referring to the drawings, A is a circular rail upon which runs a series of rollers $b$ mounted upon a spider, the construction of which is well illustrated in Figs. 3 and 4. Each of the rollers runs upon a spreader $b^1$ which is confined between a ring B of outwardly facing angle-iron and an inner ring $B^1$ made from strap or sheet metal, the rings B and $B^1$ being held together by bolts $b^2$ passed through the spreaders $b^1$ and having heads on the outside and nuts $b^3$ on the inside. Centrally located within the rail A is a boss $B^2$ shouldered at its upper end to provide a bearing for a ring $B^3$ of inwardly facing angle-iron. The ring $B^3$ is connected to the bolt $b^2$ by eye-bolts $b^4$ having nuts inside the ring $B^3$ and clevises $b^5$ secured upon the bolts $b^2$ by nuts within the loops of the clevises, the eye-bolts and clevises being fastened together at their ends by bolts passing therethrough. By this arrangement a rotatable spider is provided which is of light and simple construction and yet exceedingly strong, the suspension principle being utilized for producing the requisite strength.

Above the spider is a platform C supplied on its lower surface with a downwardly facing rail $c$ running upon the tops of the rollers $b$. The platform C is prevented from lateral or radial displacement and yet is permitted freely to rotate by means of a boss $C^1$ secured to its lower face, the said boss being shouldered to coöperate with the shoulder on the boss $B^2$. These two bosses are centrally perforated as illustrated and afford a passage for a pipe D through which the water supply can be taken to the boiler on the platform C.

Upon the platform C is mounted a turning-engine E which drives a drum $E^1$. Cables $e$ and $e^1$ are wound in opposite directions about the drum $E^1$ and extend thence downward over sheaves $e^2$ and $e^3$ and thence in opposite rotary directions about the angle-iron ring B of the spider, the ends of the said cables being passed through perforations provided for the purpose in the horizontal flange of said ring and secured in place by eye-bolts to brackets $e^4$, $e^5$ secured to the ring B as illustrated. It will be evident that by rotating the drum $E^1$ in one direction, the cable $e$ will be drawn in and the cable $e^1$ will be paid out so that a relative rotation will be produced between the spider and the platform C, while opposite rotation of the drum $E^1$ will produce the opposite effect in consequently opposite rotation. The arrangement is such that if power is thrown onto the turning-engine suddenly the platform C will not start with a jerk but there will be a slippage of the spider both on the rail A and the rail $c$ so that the platform C will start its rotation in a smooth and easy manner without shock or jar regardless of the suddenness with which power is applied. Furthermore, the platform will move at double the angular velocity of the spider with the result that only a comparatively short operation of the turning engine is necessary to secure a given angular movement and with the further result that to secure any given capacity for angular movement, the cables can be made half the usual length.

The platform carries, as illustrated in Fig 1, the usual derrick-boom and the usual engine and other mechanism for operating the derrick-boom and parts to be raised by the derrick-rope, all in usual and common form.

The derrick-platform and turning-mechanism herein illustrated, described and claimed is matter divided out of an application filed by me on the 24th day of January, 1908, and allotted Serial No. 412,401, the subject matter of said application being a "Car-unloading apparatus", in which as the preferred form of construction, the derrick-platform and turning-mechanism herein illustrated, described and claimed are embodied.

It will be obvious that the mechanism here shown and described is capable of embodiment in various other forms of construction in addition to the one forming the subject-matter of the application from which it has been divided, and for this reason I have not seen fit to illustrate or describe in detail those parts of the car-unloading apparatus not having a direct bearing upon the peculiar operation of the platform and turning-mechanism.

I realize that considerable variation is possible in the details of construction of my improved device, without departing from the spirit of my invention, and I do not intend therefore, to limit myself to the specific form herein shown and described.

What I claim as new, and desire to secure by Letters Patent, is—

1. In a device of the class described, the combination with a stationary circular track, of a spider having a series of rollers adapted to run upon the track, a platform having a circular track mounted upon said rollers and means having direct connection with the spider for rotating said spider with respect to one of the tracks to rotate the platform.

2. The combination with a stationary circular track, of a spider having a series of rollers running on the track, a platform having a track running upon said rollers, and means having direct connection with the spider for rotating said spider with reference to said platform.

3. The combination with a stationary circular track, of a spider having a series of rollers running upon said track, a platform having a track resting upon said rollers, a drum on the platform, and cables engaging the spider and running over the drum and adapted to produce relative rotation between the platform and the spider.

4. The combination with a stationary circular track, of a spider having a series of rollers running on said track, a platform having a track supported by said rollers, a drum mounted upon said platform, and two cables running in opposite directions upon said drum and having their ends wound in opposite rotary directions about said spider, whereby the rotation of said drum will draw in one cable and pay out the other and thereby cause relative rotation between the spider and platform.

JOHN W. PAGE.

In presence of—
 L. HEISLAR,
 CHAS. E. GAYLORD.